(12) United States Patent
Madsen et al.

(10) Patent No.: US 6,253,000 B1
(45) Date of Patent: Jun. 26, 2001

(54) OPTICAL SPACE SWITCHES USING MULTIPORT COUPLERS

(75) Inventors: Christi Kay Madsen, South Plainfield; Julian Bernard Soole, Edison, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/253,398

(22) Filed: Feb. 19, 1999

(51) Int. Cl.$^7$ .................................................. G02B 6/35
(52) U.S. Cl. ............................................ 385/16; 385/24
(58) Field of Search ............................. 385/1–8, 15–24

(56) References Cited

U.S. PATENT DOCUMENTS

| | | | |
|---|---|---|---|
| 4,807,280 | * | 2/1989 | Posner et al. .......................... 379/272 |
| 5,933,554 | * | 8/1999 | Leuthold et al. ....................... 385/28 |
| 6,084,992 | * | 7/2000 | Weber et al. ............................ 385/24 |

OTHER PUBLICATIONS

T. L. Koch and U. Koren, "Photonic Integrated Circuits", Integrated Optoelectronics, Academic Press, 1995, pp. 558–626.
H. S. Hinton, J. R. Erickson, T. J. Cloonan and G. W. Richards, "Space–Division Switching", Chapter 3 of Photonics in Switching, vol. II: Systems, Academic Press, 1993, pp. 119–167.
S.J. Madsen, "Properties of Nonblocking Single–Substrate Optical Switching Networks Constructed From Directional Couplers", Dec. 20, 1994, pp. 8375–8386, Applied Optics.
R.M. Jenkins et al., "NOvel 1 X N and N X N Integrated Optical Switches Using Self–Imaging Multimode GaAs/AlGaAs Waveguides", Feb. 7, 1994, pp. 684–686, Applied Physics Letters.
L.B. Soldano et al., "Optical Multi–Mode Interference Devices Based on Self–Imaging: Principles and Applications", Apr. 1995, No. 4, pp. 615–627, IEEE.
"Silicon Optical Bench Waveguide Technology", Y.P. Li and C.H. Henry, Chapter 8 of "Optical Fiber Telecommunications IIIB", ed., I.P. Kaminow and T.L. Koch, Academic Press, 1997—p. 319, Section I only.
"Lithium Niobate Integrated Optics: Selected Contemporary Devices and Systems Applications", F. Heismann, S.K. Korotsky and J.J. Veselka, Chapter 9 of "Optical Fiber Telecommunications IIIB", ed. I.P. Kaminow and T.L. Koch, Academic Press, 1997—p. 377 only.
"16×16 Strictly Nonblocking Guided Wave Optical Switching System", E.J. Murphy, T.O. Murphy, A.F. Ambrose, R.W. Irvin, B.H. Lee, P. Peng, G.W. Richards and A. Yorinks, J. Lightwave Tech., 14, pp. 352–358, 1996.

(List continued on next page.)

*Primary Examiner*—Brian Healy
*Assistant Examiner*—Michelle R. Connelly-Cushwa
(74) *Attorney, Agent, or Firm*—Lowenstein Sandler PC

(57) ABSTRACT

The present invention provides N×N non-blocking switch modules using MMI-based switch elements. The arrangement requires a minimum of control elements to effect switching and uses no crossings of the signal waveguides. The switch control settings may be determined by following a simple and transparent algorithm for the setup procedure. Very high-order switch fabrics comprising a variety of the taught nonblocking N×N switch modules are envisaged. Determination of the appropriate values for 'N' is a practical consideration which trades-off the performance of the individual switch modules with the complexity required of the associated module interconnection fabric. The spatial switch fabrics that may by built from the non-blocking MMI-based switch arrangements may be combined with both wavelength-division switches and time-division switches to form any combination of higher order space-wavelength-time switch.

15 Claims, 7 Drawing Sheets

OTHER PUBLICATIONS

"Low–Loss and High–Extinction–Ratio Silica–Based Strictly Nonblocking 16×16 Thermooptic Matrix Switch", T. Goh, M. Yasu, K. Hattori, A. Himeno, M. Okuno and Y. Ohmori, Photonics Technology Letters, 10, pp. 810–812, 1998.

R. Ulrich, "Image Formation by Phase Coincidences in Optical Waveguides", Optical Communications, 13, pp. 259–264, 1975.

L. Soldano, F.B. Veerman, M.K. Smit, B.H. Verbeek, A.H. Dubost, and E.C.M. Pennings, "Planar Monmode Optical Couplers Based on Multi–Mode Interference", J. Lightrwave Tech., 10, pp. 1843–50, 1992.

L. Soldano and E. Pennings, "Optical Multi–Mode Interference Devices Based on Self–Imaging: Principles and Applications", J. Lightwave Tech., 13, pp. 615–627, 1995.

M. Bachman, P.A. Besse, and H. Melchior, "General Self–Imaging Properties in N×N Multimode Interference Couplers Including Phase Relations", pp. 3905–3911, 1994.

P.A. Besse, M. Bachmann, H. Melchior, L.B. Soldano and M.K. Smit, "Optical Bandwidth and Fabrication of Multimode Interference Couplers", J. Lightwave Tech., 12, pp. 1004–9, 1994.

E.C.M. Pennings, R.J. Deri, A. Scherer, R. Bhat, T.R. Hayes, N.C. Andreadakis, M.K. Smith, L.B. Soldano, and R.J. Hawkins, "Ultracompact Low Loss Directional Couplers on InP Based on Self–Imaging by Multimode Interference", Applied Physics Letters, 59, pp. 1926–28, 1991.

R.M. Jenkins, J.M. Heaton, D.R. Wight, J.T. Parker, J.C.H. Birbeck and K.P. Hilton, "Novel 1–to–N Way Integrated Optical Beam Splitters Using Symmetric Mode Mixing in GaAs/AlGaAs Multimode Waveguides", Applied Physics Letters, 61, pp. 1754–56, 1992.

R.M. Jenkins, J.M. Heaton, D.R. Wight, J.T. Parker, J.C.H. Birbeck, G.W. Smith and K.P. Hilton, "Novel 1×N Integrated Optical Switches Using Self–Imaging Multimode GaAs/AlGaAs Waveguides", Appl. Phys. Lett., 64, pp. 684–6, 1994.

M. Bachmann, Ch. Nadler, P.A. Besse, and H. Melchior, Compact Polarization Multi–Leg 1×4 Mach–Zehnder Switch in InGaAs/P/InP, European Conf. On Optical Communications, ECOC '94, Conference Proceedings, pp. 519–522, 1994.

C. Van Dam, M.R. Amersfoort, G.M. ten Kate, F.P.E.M. van Ham, M.K. Smit, P.A. Besse, M. Bachmann and H. Melchiro, "Novel InP–Based Phased–Array Wavelength Demultiplexer Using Generalized MM1–MZ1 Configuration", Europoean Conference on Integtrated Optics, EC10'94, Genoa, Italy, Conference Proceedings, pp. 275–8, 1994.

Liestuen and A. Sudbo, "8–Channel Wavelength Divsiion Multiplexer Based on Multimode Interference Couplers", Photonics Technology Letters, 7, pp. 1034–36, 1995.

Bachmann, P.A. Besse, Ch. Nadler, and H. Melchior, "The Integrated Prism Interpretion of Multi–Leg Mach–Zehnder Interferometers Based on Multimode Intrreference Couplers", Optical and Quatum Electronics, 27, pp. 909–920, 1995.

M.R. Paiam and R.I. MacDonald, "Design ofg Phased–Array Wavelength Division Mutlplexers Using Multimode Interference Couplers", Applied Optics, 36, pp. 5097–5108, 1997.

* cited by examiner

| RELATIVE POWER/ RELATIVE PHASE | |
|---|---|
| 1/3 | 0 rad |
| 1/3 | $\pi$ rad |
| 1/3 | $2\pi/3$ rad |

$L = (M/3)\pi / (\beta_0 - \beta_1)$

| INPUT PORT | FOR OUTPUT 1 | FOR OUTPUT 2 | FOR OUTPUT 3 |
|---|---|---|---|
| 1 | 0 | $-\pi/3$ | $-2\pi/3$ |
| 2 | $\pi/3$ | 0 | $-\pi/3$ |
| 3 | $-2\pi/3$ | $\pi/3$ | 0 |

FIG. 5A
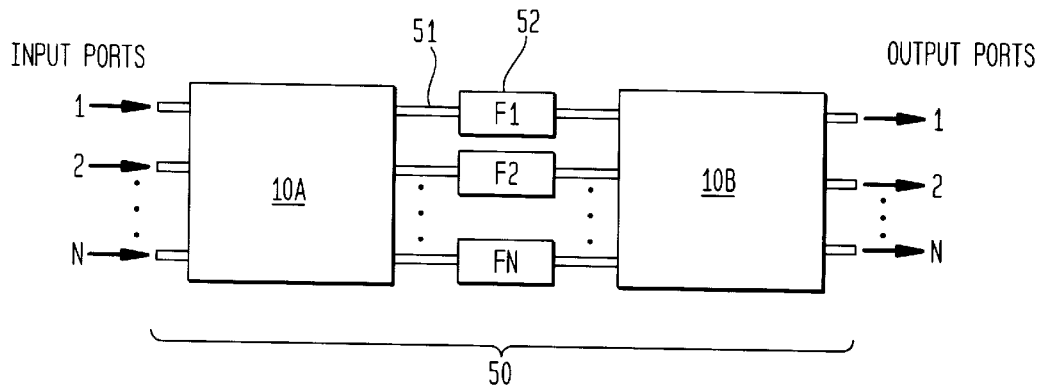
FIG. 5B
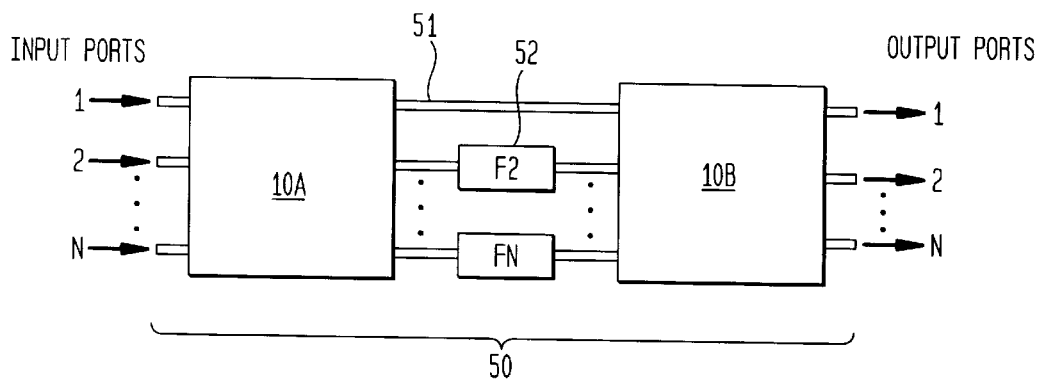
FIG. 6
| INPUT SIGNAL SWITCHED TO: | | | PHASE OF CONTROL ELEMENT (WITH F1=0) | |
|---|---|---|---|---|
| OUTPUT 1 | OUTPUT 2 | OUTPUT 3 | F2 | F3 |
| INPUT 3 | INPUT 2 | INPUT 1 | $2\pi/3$ | 0 |
| INPUT 1 | INPUT 3 | INPUT 2 | $\pi/3$ | $\pi/3$ |
| INPUT 2 | INPUT 1 | INPUT 3 | 0 | $2\pi/3$ |

| INPUT ROUTED TO: | | | PHASE OF 1st STAGE CONTROL ELEMENT (UNITS OF $2\pi/3$) | | PHASE OF 2nd STAGE CONTROL ELEMENT (UNITS OF $2\pi/3$) | |
|---|---|---|---|---|---|---|
| OUTPUT 1 | OUTPUT 2 | OUTPUT 3 | F21 | F31 | F22 | F32 |
| 1 | 2 | 3 | 2 | 1 | 2 | 1 |
| 1 | 2 | 3 | 1 | 2 | 1 | 2 |
| 1 | 2 | 3 | 0 | 0 | 0 | 0 |
| 1 | 3 | 2 | 0 | 1 | 1 | 0 |
| 1 | 3 | 2 | 1 | 0 | 0 | 1 |
| 1 | 3 | 2 | 2 | 2 | 2 | 2 |
| 2 | 1 | 3 | 2 | 2 | 1 | 0 |
| 2 | 1 | 3 | 0 | 1 | 0 | 1 |
| 2 | 1 | 3 | 1 | 0 | 2 | 2 |
| 2 | 3 | 1 | 1 | 2 | 0 | 0 |
| 2 | 3 | 1 | 0 | 0 | 2 | 1 |
| 2 | 3 | 1 | 2 | 1 | 1 | 2 |
| 3 | 1 | 2 | 2 | 1 | 0 | 0 |
| 3 | 1 | 2 | 1 | 2 | 2 | 1 |
| 3 | 1 | 2 | 0 | 0 | 1 | 2 |
| 3 | 2 | 1 | 1 | 0 | 1 | 0 |
| 3 | 2 | 1 | 2 | 2 | 0 | 1 |
| 3 | 2 | 1 | 0 | 1 | 2 | 3 |

| INPUT ROUTED TO: | | |
|---|---|---|
| OUTPUT 1 | OUTPUT 2 | OUTPUT 3 |
| INPUT 3 | INPUT 2 | INPUT 1 |
| INPUT 2 | INPUT 3 | INPUT 1 |
| INPUT 1 | INPUT 3 | INPUT 2 |
| INPUT 1 | INPUT 2 | INPUT 3 |
| INPUT 2 | INPUT 1 | INPUT 3 |
| INPUT 3 | INPUT 1 | INPUT 3 |

FIG. 11A
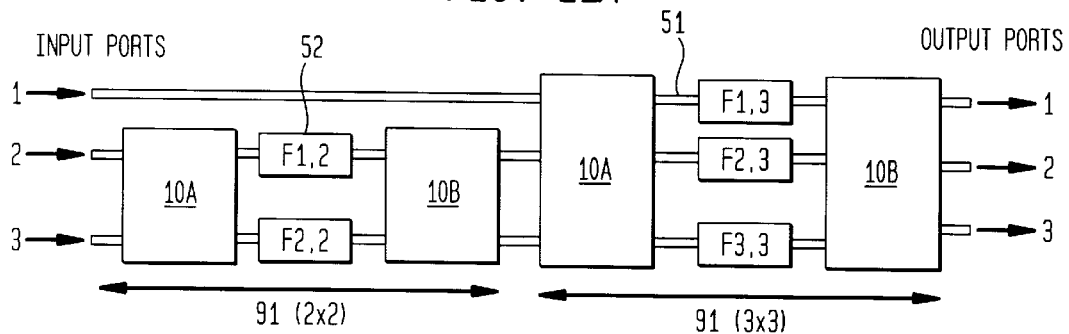
FIG. 11B
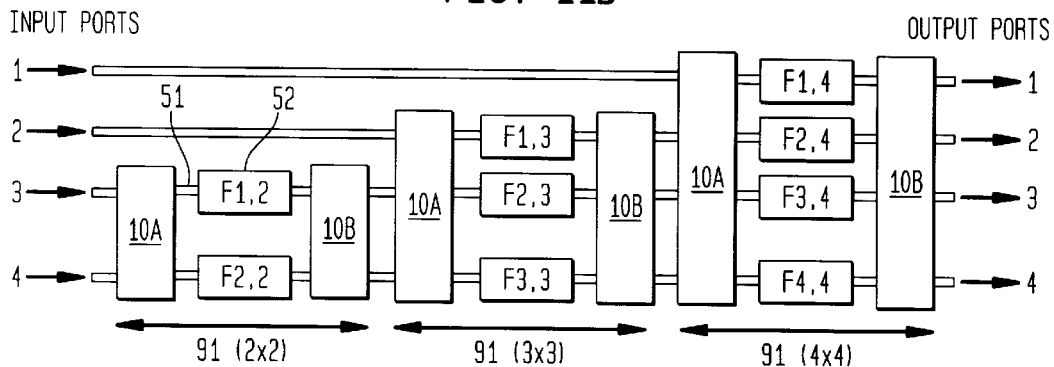
FIG. 12
| INPUT ROUTED TO: | | | PHASE OF 3x3 CONTROL ELEMENTS (UNITS OF $2\pi/3$) (F1,3 SET TO 0) | | PHASE OF 2x2 CONTROL ELEMENTS (UNIT OF $\pi$) (F1,2 SET TO 0) |
|---|---|---|---|---|---|
| OUTPUT 1 | OUTPUT 2 | OUTPUT 3 | F2,3 | F3,3 | F2,2 |
| INPUT 3 | INPUT 2 | INPUT 1 | 2 | 0 | 1 |
| INPUT 2 | INPUT 3 | INPUT 1 | 2 | 0 | 0 |
| INPUT 1 | INPUT 3 | INPUT 2 | 1 | 1 | 1 |
| INPUT 1 | INPUT 2 | INPUT 3 | 1 | 1 | 0 |
| INPUT 2 | INPUT 1 | INPUT 3 | 0 | 2 | 1 |
| INPUT 3 | INPUT 1 | INPUT 2 | 0 | 2 | 0 |

OPTICAL SPACE SWITCHES USING MULTIPORT COUPLERS

FIELD OF THE INVENTION

This invention relates to optical switches for fiber-optic communications systems and, in particular, to an optical space switch wherein all possible combinations of output routing of the input signals can be effected by an appropriate setting of the switch.

BACKGROUND OF THE INVENTION

Space-division switches are central to telecommunications networks. A combination of space-division switches and time-division switches, for example, provide the kernel to the AT&T ESS™ electronic switches used in the North American Telecommunications network.

With the advance of fiber-optic communications and the attendant rapid growth in the carrier bit-rate and typical cable fiber-counts, as well as the increased level of network complexity, there has been a growing interest in space-division switches that operate in the optical-domain, routing optical signals from a set of inputs to a set of outputs without intermediate conversion of the optical signals to electronic form. A good introduction to these optical space-division switches is provided by Hinton et al. [Ref. 4]. (Numbered references are fully cited in the References section at the end of this disclosure. All cited references are incorporated herein by reference).

As described by Hinton et al, a space-switch of large order, i.e. one with a large number of inputs, is typically constructed of smaller elemental space-switches interconnected in a prescribed manner. As the order of the switches increases, it is also seen that the high-order switch rapidly comes to comprise a very large number of switch elements. Also, that the number of crossings of the signal paths increases. Both these effects hinder the practical realization of the switch which become increasingly more difficult as the switch order increases.

To date, practical space switches of order 16×16 have been realized in the Lithium Niobate material system [Ref. 7], and also in the doped silica waveguide material system [Ref. 8] The former reference describes a 16×16 switch that comprises 23 modules connected in a three-stage network architecture and contains in total 448 2×2 directional coupler waveguide switch elements with 308 waveguide cross-overs and 42 crossings in the module connection fabric. The latter reference describes a 16x16 switch which uses a 16x16 matrix of double Mach-Zehnder 2×2 switching elements on a single silica waveguide substrate and employs a total of 512 MachZehnder elements with 512 waveguide cross-overs.

Practical considerations determine that a space-division switch should be realized with a minimum number of switch elements and a minimum complexity of the routing fabric that interconnects them. In order to realize the highest-order switches, the switch fabric is advantageously composed of individual switch modules that are then inter-connected to provide the overall switching. This alleviates the severe packaging challenge that would occur if the entire switch fabric were realized as a single module, with the attendant necessarily lower chip yield and the increased complexity and restrictions of the required module electrical and thermal management. The switch modules themselves generally comprise a number of switch elements built up into a higher-order switch fabric and may also contain several such independent higher-order switches. The art of a good overall switch design lies to a large extent in determining the optimum trade off between a complexity of the switch fabric that occurs within an individual switch module and the complexity of the interconnection that occurs between the switch modules. Increasing the complexity of the switch fabric within a module and on a single waveguide substrate increases the complexity of the attendant electrical and thermal management and reduces the anticipated wafer yield. However, it alleviates the number of interconnections that must then be provided between the switch modules to form the overall switch fabric. Reducing the order or complexity of the switching function provided within the modules eases the module electrical and thermal packaging constraints but increases the complexity of the interconnection fabric.

An example of this trade off is provided by the 16×16 Extended Generalized Shuffle (EGS) network switch described by Murphy et al [Ref. 7]. This 16×16 switch fabric comprises 448 of the basic 2×2 switch elements realized in 39 switch modules of a three-stage network; 16 modules each containing two 1×8 switches (comprising seven 2×2 switch elements) provide the first column of the network, 7 modules each providing a 16×16 switch functionality (comprising thirty two 2×2 switch elements in a 4 column Banyan architecture) compose the center column, and a final 16 modules each containing two 1×8 switches form the third column. The fiber network interconnecting these 39 modules is relatively simple to provide, being 112 connections between the first and second stage of the network and another 112 connections between the second and third stages, all arranged in a simple geometric fashion. The waveguide switch fabrics of the 7 center switch modules each contain 44 waveguide crossovers, and the waveguide switch fabrics of the modules in the first and third network columns contain no waveguide cross-overs at all. The vast majority of the signal cross-overs required for this 16×16 EGS switch fabric, however, are provided by the fiber connections that link the switch modules. This is highly advantageous as the 'cross-over'of the fibers are loss-free and with negligible cross-talk, whereas signal crossings in waveguides on a waveguide switch-bearing substrate is always accompanied by some signal loss and also some signal cross-talk. The 16×16 EGS switch fabric has thus been partitioned into a modest number of switch modules so as to gain the advantage of integrating many switch elements onto the same waveguide substrate while the waveguide interconnection complexity and potential consequent performance degradation has been limited by using fiber to interconnect between the switch modules.

In consideration of the arrangement of the switch fabric or fabrics that occurs on a single substrate and may be packaged either on its own or with others as a module of the overall switching network, good design seeks to minimize the number of active switching elements, the number of elements through which the signals may pass, and the number of signal waveguide crossings that occur on-chip.

The 16×16 space switches described above were built up of individual 2×2 switch elements. It is evident that if a basic switch element of a higher order were available, fewer of such elements would be required to form the overall switch. In the case of Goh [Ref. 8], for example, the 16×16 switch matrix array uses 256 2×2 switch units (each comprising two 2×2 Mach-Zehnder interferometers, doubled-up in order to obtain a high extinction ratio on switching) but would only comprise 64 switch elements if the basic switch element were a 4×4 switch. In the case of Murphy [Ref. 7], availability of a 1×8 basic switch element would reduce the number of switch elements employed in the first and last columns of the fabric from 224 to 32, and the availability of a basic 4×4 switch element would reduce the number of elements required for the center column from 224 to 70 (14 4×4 and 56 2×2 elements), for a total element count of 102, reduced from the present 448. It is clear that use of higher-order elemental switch units provides a very significant reduction in the total number of elements required.

A form of multi-port waveguide device, known as the multi-mode interference (MMI) coupler, first noted in 1975 [Ref. 9], has over the past few years received considerable attention arising from its properties of self-imaging [Refs. 10, 11, 12]. This is the property whereby an optical field presented to the input of the multi-moded section gets re-imaged further along the multi-moded waveguide at well defined optical path-lengths from the input plane. These self-images may be single or multiple depending on the placement of the input field in the waveguide cross-section and the optical path length to the image plane. The simplest occurrence of self-imaging is, perhaps, the single self-image of a input field which occurs at distance L1, 1 along the multi-mode waveguide section, where $L1,1=3\pi/(\beta 0-\beta 1)$, and $\beta 0$ and $\beta 1$ are the propagation constants of the lowest and first order modes of the multi-moded waveguide. N multiple images are obtained at distances LN,M where $LN,M =(M/N) 3\pi/(\beta 0-\beta 1)$ and M is an integer such that M and N do not have a common divisor [Ref. 12]. In the waveguide device, the input field is restricted and is typically provided by a single moded input waveguide. For an N×N MMI coupler there are N positions where the input guide may be placed which would give rise to N outputs. For a uniform power splitter, the N output signals differ only in their relative phase. A complete description of MMI N×N couplers, including the phase relations of the outputs is given by Bachmann [Ref. 12].

The multi-fold imaging property of multi-mode interference couplers has been exploited in the use of MMI couplers as compact 2×2 couplers and as 1×N power splitters [Refs. 14, 15].

Since the operation of the MMI imaging coupler is symmetric with respect to the propagation of the light, a 1×N coupler which has presented to its N output ports optical fields that are of the same relative intensity and certain relative phases will, upon presentation at these outputs of the same signals in, combine these fields so as to provide a single emergent field corresponding to the single input field of the inverse operation. Changing the relative phases of these input signals to those corresponding to those from a different input position of the inverse operation causes the output to be switched to that latter port. In this manner, a switching action may be effected.

This switching action has been demonstrated for a 1×10 switch in the GaAs/AIGaAs material system using a 10×10 MMI coupler fed by 10 signals from a 1×10 MMI power splitter with phase modulators on each of the 10 inputs to the 10×10 MMI to control the relative phase of the input signals to switch the light signal to each of the 10 output ports [Ref. 16]. (Although a '10×10'switch is claimed in the paper title, use of a 10×10 MMI to provide the input to the second 10×10 MMI adds no additional functionality; the concatenated 10×10 MMI couplers allows just 10 switch settings.) A 1×4 switch implementation in the InP material system has been demonstrated using two 4×4 MMI couplers with phase control sections on the connecting arms [Ref. 17]. In this case, also, the first MMI coupler provides a power splitting and the phase controls set the relative phases of these equal-power inputs into the second MMI; setting the phase controls appropriately allows the output to be switched to any of the 4 output ports.

We note that MMI-based couplers are particularly suitable for use in integrated power splitters and switch elements because, although they rely on interference effects to perform the self-imaging which routes the signals to the different output ports, it has been shown that this imaging operation is only very weakly polarization sensitive and displays a high tolerance to variations in the device dimensions and composition that are typical in fabrication processes. They also operate over a wide optical band [Ref. 13].

In the case of the 1×4 InP based switch reference [Ref. 17], a strictly nonblocking 4×4 switch was also proposed, built from the demonstrated 1×4 MMI-based switch elements in a two column router-selector architecture [Ref. 4]. This arrangement requires 8 1×4 switches and 16 switch-element interconnects.

A 'strictly non-blocking' switch is one in which any idle input can always be connected to any idle output regardless of the arrangement of the connection already existing within the switch fabric. Lesser degrees of connectivity are described as 'wide-sense non-blocking', in which any idle input can be connected to any idle output provided that all the connections are set up according to a particular algorithm, and 'rearrangeably non-blocking', in which idle inputs may be connected to idle outputs provided existing connections may be rearranged. A strictly non-blocking switch architecture thus provides maximum flexibility for connecting input lines to output lines and is generally the most desirable type of switch. Although it is possible to form strictly non-blocking networks from component switch modules that are themselves not strictly non-blocking, strictly non-blocking networks may also be constructed using switch modules that are not themselves strictly non-blocking.

SUMMARY OF THE INVENTION

The present invention provides N×N non-blocking switch modules using MMIbased switch elements. The arrangement requires a minimum of control elements to effect switching and uses no crossings of the signal waveguides. The switch control settings may be determined by following a simple and transparent algorithm for the setup procedure. Very high-order switch fabrics comprising a variety of the taught nonblocking N×N switch modules are envisaged. Determination of the appropriate values for 'N' is a practical consideration which trades-off the performance of the individual switch modules with the complexity required of the associated module interconnection fabric. The spatial switch fabrics that may by built from the non-blocking MMI-based switch arrangements may be combined with both wavelength-division switches and time-division switches to form any combination of higher order space-wavelength-time switch.

BRIEF DESCRIPTION OF THE DRAWINGS

The advantages, nature and various additional features of the invention will appear more fully upon consideration of the illustrative embodiments now to be described in detail in connection with the accompanying drawings. In the drawings:

FIGS. 5A,5B,5C,6,7,and 8 illustrate the nature and operation of conventional optical switches used as components in optical switches according to the invention;

FIGS. 11A and 11B are illustrative embodiments of the FIG. 9 switch;

FIG. 12 is a switching table for the embodiments of FIGS. 11A and IIB;

It is to be understood that these drawings are for purposes of illustrating the concepts of the invention and are not to scale. The same reference numerals are used for similar elements throughout the drawing.

DETAILED DESCRIPTION

This description is divided into three parts. Part I describes the nature and operation of N×N multimode interference couplers (MMI couplers) which are used as components in the inventive optical switches. Part II describes conventional optical switches which can be used as components in the inventive optical switches, and Part III describes optical switches in accordance with the invention.

I. MMI Couplers

Figure 1:
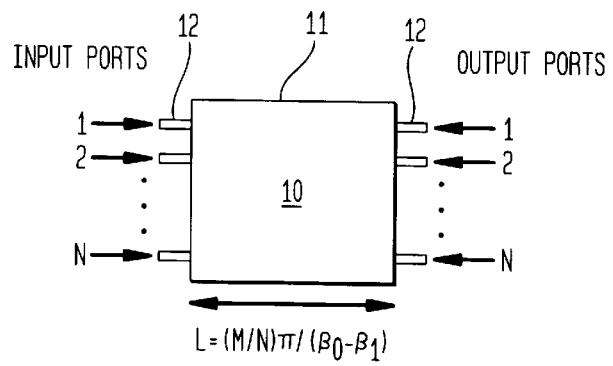
FIGS. 1,2,3,and 4 illustrate the nature and operation of conventional N×N MMI couplers used as components in optical switches according to the invention.
Figure 2:
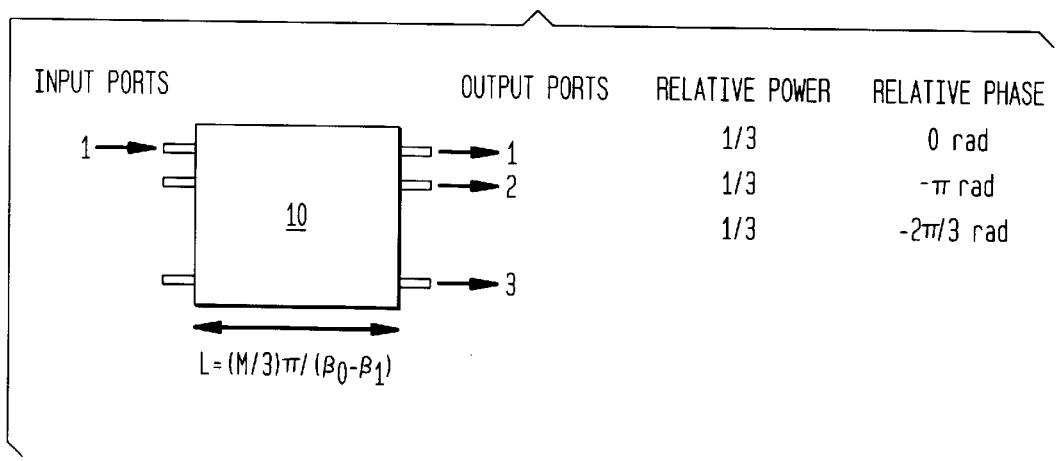
Figures 3, 4:
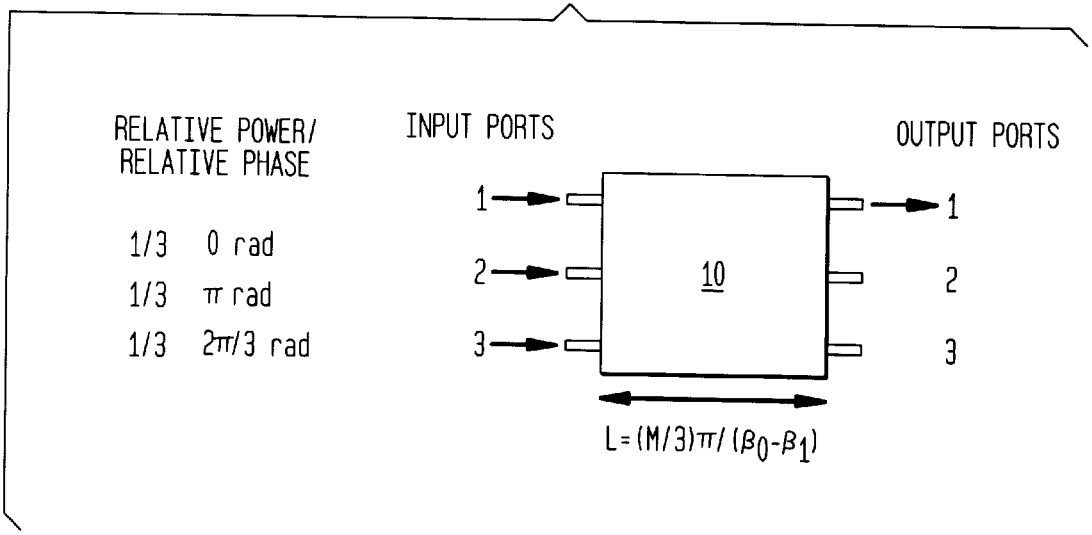

FIG. 1 illustrates an N output MMI-coupler 10 comprising a free slab region 11 of waveguide and ports 12 of single moded waveguide. There are N input ports and N output ports. The relative phases of the output signals as well as the dimensional relationships between the output, input, and coupler waveguide sections are described by Bachmann [Ref. 12]. The case where N=3 is illustrated in FIG. 2, for which the relative phases of the output optical signals are {0, $-\pi$, $-2\pi/3$}. All outputs are of equal power, being ⅓ of the input power (ignoring switch losses). FIG. 3 shows the MMI-coupler of FIG. 2 operated in reverse; when equal-power signals are applied to the three inputs in the same phase relationship (but opposite sign) as those shown in FIG. 2, a single output is obtained from the uppermost output, 1.

In the same manner, setting the input phases to correspond to the signals that emerge from the r.h.s. of the MMI-coupler in FIG. 2 when the signal is supplied on input 2 results in a signal emerging from output 2 in FIG. 3. And similarly for input 3 in FIG. 2 and output 3 of FIG. 3. A table of the required phase relations are collected in FIG. 4.

II. Conventional Switches

FIG. 5(A) shows a conventional switch 50 formed by connecting two MMI-based couplers 10A and 108 connected in series with connecting links 51 including phase control elements 52 (designated F1, F2, . . . , FN). As only the relative phases between the inputs of the second MMI-coupler are relevant, one phase control element (e.g. F1) may be omitted and only N-1 phase control elements are required. By then appropriately setting the N-1 phase control elements, an input presented to any of the N input ports of the l.h.s. MMI coupler can be switched to any of the N outputs on the r.h.s. of the r.h.s. MMI coupler. This is illustrated in the lower diagram of the FIG. 5(b).

Different physical realization of the phase control elements are possible, and may depend on the material system employed for the waveguide structures. For semiconductor-based waveguides, electro-optic or carrier effects may be employed; for Lithium Niobate guides, electro-optic induced phase changes may be used; and for doped silica guides, the thermo-optic effect may be used to effect the required phase changes. To maintain polarization insensitivity, the phase control elements should be polarization independent.

The switch illustrated in FIG. 5 may route a single input presented to the l.h.s. MMI coupler to any of the outputs of the r.h.s. MMI-coupler. With each such setting of the intermediate control elements 52, signals presented to the other inputs of the l.h.s. MMI coupler are routed to the other r.h.s. MMI-coupler outputs. A table describing this routing is given in FIG. 6 for the case when N=3. Only 3 switch states are possible.

Figures 7, 8:
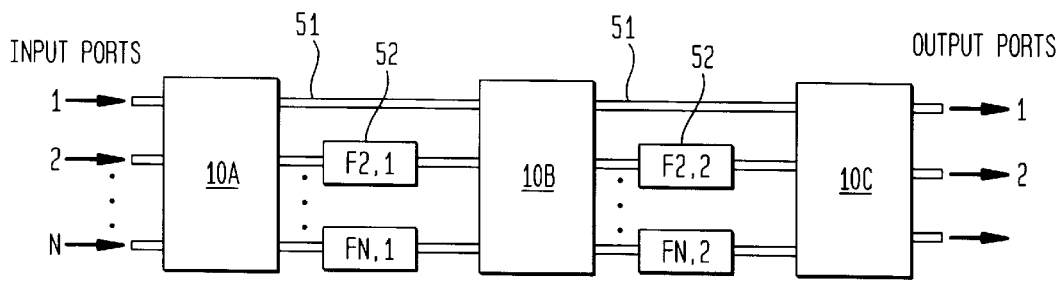

For complete connectivity N! switch states are required. This complete set of switch states may be obtained by concatenating identical MMI-couplers and phase control elements. For an N×N switch, N-1 stages of N-1 phase controllers per stage are required. FIG. 7 illustrates this for a 3×3 switch requiring 3! =6 states. Here, two phase control stages, each with control elements 52 on two of the interconnecting waveguide links 51, are employed between three 3×3 MMI couplers 10A, 10B, 10C. The routing table for this switch arrangement is shown in FIG. 8.

It has been seen that each of the switch states is provided by three independent combinations of the phase control elements. For output switching to occur, the different components of each signal passing through the cascaded lattice by different routes must arrive at the designated output in phase with each other. Since each MMI coupler provides its outputs with signals of relative phases in multiples of $\pi/N$, and the output ports at the end of the MMI coupler lattice must be provided with signal components that are in phase, modulo $2\pi$, it follows that the phase control elements must provide phase corrections that are multiples of $\pi/N$. For a N×N switch which has N-1 stages of N-1 phase control elements per stage, a total of $2N(N-1)^2$ potential phase control settings is possible. The interaction between the different concatenated MMI coupler elements restricts this total number to the solution set providing switching of each of the input signals to a single distinct output line. In the case of the 3×3 switch illustrated in FIGS. 7 and 8, a total of 18 valid switch settings are possible, which provide a redundancy factor of 3 in the setting of the 3!, i.e. 6, unique switch settings.

Although the concatenated N×N MMI coupler switches can provide full N×N switching functionality, the algorithmic complexity of determining the control element settings required to effect any particular switch configuration, along with the complex interactions that occur between the phase control elements of one switching stage and the phase control elements of the other stages which inhibits an efficient and effective means of determining the phase control element settings in practical devices, means that a simpler N×N switching configuration is desirable.

III. Optical Space Switches In Accordance With The Invention

Figures 9, 10:
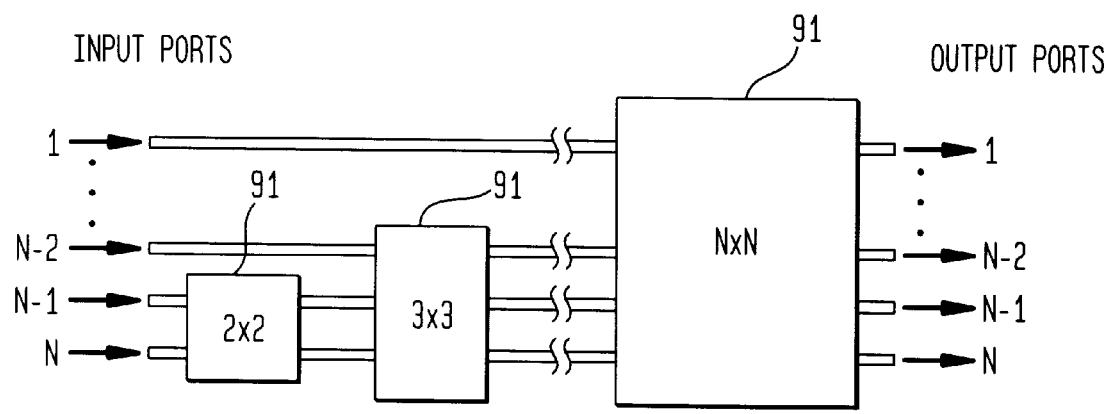
FIG. 9 illustrates a space-division optical switch in accordance with the invention.
FIG. 10 is a table of the output switch states for the switch of FIG. 9.

FIG. 9 schematically illustrates a simplified N×N non-blocking optical routing switch in accordance with the invention comprising a sequence of connected optical switches 91 (2×2), 91 (3×3), . . . , 91 (N×N) forming a sequential series of switches of unitary increasing switch dimension. By non-blocking it is meant that all possible combinations of output routing of the input signals can be effected by an appropriate setting of the switch. One or more, and preferably all of the switches 91 are switches as shown in FIGS,. 5(a) or 5(b), comprising a pair of multiport self-imaging multimode interference couplers interconnected by a plurality of optical pathways including a respective plurality of phase controlling elements (as shown in FIGS. 5(a) and 5(b). The first switch 91 (2×2) is a 2×2 switch, the second is a (3×3) switch. The dimensions of the switches increment unitarily until the last switch is N×N. In practical embodiments N is typically $\geq 4$ and advantageously $\geq 8$.

In examining the behavior of the switch illustrated in FIG. 9, we notice that if the output routing combinations provided by the 3×3 MMI coupler of the type illustrated in FIG. 5 and written out in FIG. 6 are examined and compared with the full set of possible routing combinations shown in FIG. 10, it is seen that the additional routing combinations are provided by simply swapping the input signals provided to two of the input lines. In FIG. 10 this is illustrated by keeping input port 1 fixed and then for each combination adding the case where input ports 2 and 3 are swapped. The swapped combinations are shown in italics.

Thus, it is seen that by including the case in which inputs 2 and 3 are reversed, the complete set of 3! switch states are achieved. That this is inevitable is understood by considering the fact that a single input of the 3×3 is routed to the different output ports by the different settings of the controllers and that each such setting routes the other two inputs to the two remaining output ports in a certain fixed manner. If, however, these two inputs can be presented to the two input ports of the 3×3 then both of the two possible output routing combinations for these two inputs can be accessed.

If we now increase the switch module size to a 4×4 by adding a subsequent 4×4switching stage according to FIG. 9, the same argument may again be made. For each of the four routing settings of the 4×4 switching stage the single uppermost input signal is routed to a certain output and the remaining lower three inputs are routed to the other three outputs in a certain prescribed manner. If these three inputs can now be rearranged to feed the inputs of the 4×4 switching stage in all of the possible combinations, then all routing possibilities for these three inputs can be achieved and all of routing combinations of the four inputs of the overall 4×4 switch can be accessed. Such rearrangement of the three lower inputs is provided by the cascade of a 2×2 and a 3×3 switching stages, as just described, above.

FIG. 11 (A) illustrates in greater detail a fully configurable 3×3 switch comprising a cascade of a 2×2 and a 3×3 switching element, and FIG. 11(B) shows a fully configurable 4×4 switch comprising a cascade of a 2×2, 3×3, and 4×4 element, according to the above description. In this manner, a N×N non-blocking switch may be realized by cascading N−1 switching elements of the type illustrated in FIG. 5, where the switching elements increases from a 2×2 to a (N−1)×(N−1), as illustrated in FIG. 9.

The number of phase control elements required by this incrementing cascade switch architecture arrangement is seen to be N(N−1)/2. Thus, where N−1 elements are used in each N×N stage (recognizing the fact that only relative phases are important and that one connecting link therefore does not have to bear a control element), a 16×16 switch, just 120 control elements are required. This number is significantly less than the $(N-1)^2$, or 225 control required for the lattice switch arrangement illustrated in FIG. 7, and the $N^2$, or 256, required for a matrix switch such as that of Goh [Ref 8].

The switching table for the 3×3 non-blocking switch shown in FIG. 11 is given in FIG. 12. It is an expansion of the table provided in FIG. 10 and shows explicitly the phase settings of the control element in the 2×2 switching stage that effects the reversal of inputs 2 and 3 to the 3×3 switching stage element illustrated in the arrangement of FIG. 11. It is seen from FIG. 12 that symmetry considerations limit the number of combined states employed by the phase control elements. These are the same symmetry considerations that determine the acceptable states of the individual phase elements in the cascade. In the case illustrated, there are 3 distinct states employed by the phase control elements of the 3×3 element and 2 states employed by the 2×2 element, for a total of 3! switch states. In practice, the electrical control circuitry may set the combination of phase controllers according to the switch state that has been selected, rather than set the phase settings of each individual phase controller element separately. In the above example of a 3×3 switch, this corresponds to 3 control settings for the 3×3 stage and 2 settings for the 2×2 stage. A total of just 2×3, or 6, six control settings are thus required, corresponding to the six routing settings of the overall 3×3 switch.

In practice, the phase control elements of the switch fabric are not fabricated with sufficient accuracy to provide a-priori knowledge of their operational characteristics; their performance must be determined after formation, inferred from the behavior of the overall switch module. In the case of the lattice switch of FIG. 7, (or in general for complex matrix switches where access to the individual switching elements is not possible) the interaction between the control elements of each stage is complex and the individual characteristic of any given control element has to be extracted in an exacting and non-transparent manner from the overall performance of the complete switch fabric. In stark contrast, the performance of the individual switch elements of the arrangement of FIG. 9 may be examined independent of each other by examining the routing behavior of the signal applied to the single uppermost input port; each individual switch element is available to simple external examination and the control elements of the entire N×N switch may be set up according to a simple algorithm.

A simple set-up procedure begins with a signal applied to input 1 with no inputs applied to the inputs 2 through N. The control elements of the last, N×N, switch element are then configured so that this input signal can be routed to each of its N output ports. By routing the input signal in sequence to the N outputs, the N−1individual control elements of this N×N MMI-based switch element in the N−1'th stage of the switch may be tuned in to their optimum values. With the control elements on this last switch element optimized, the input signal on input line 1 may be removed and replaced by a signal on input line 2. This signal passes directly to the (N−1)×(N−1) switch element and then through the final N×N switch element. With the control elements of the last N×N switch element now optimized and set to a known state, the control elements on the (N−1)x(N−1) switch may now be optimized by running through the routing states of that switch. Once the control elements of this (N−1)x(N−1) switching stage are optimized, the control elements of the (N−2)x(N−2) switch may be optimized. And so on, until the solatory control element of the 2×2 switch is optimized. In this way, all the N(N−1)/2 control elements of the fully non-blocking N×N switch may be readily optimized.

Waveguide crossings always cause a certain amount of the transmitted signal power to be lost and also introduces some cross-talk as some light from one path leaks into the other. They also require significant device area as largeradius waveguide bends are required in order to route without incurring bend-related power losses. Waveguide crossings in switch elements should thus be keep to a minimum whenever practicable. The taught implementation of a non-blocking N×N routing switch, in contrast to traditional N×N switching elements, has no waveguide crossings at all, and is thus highly advantageous.

Figure 13:
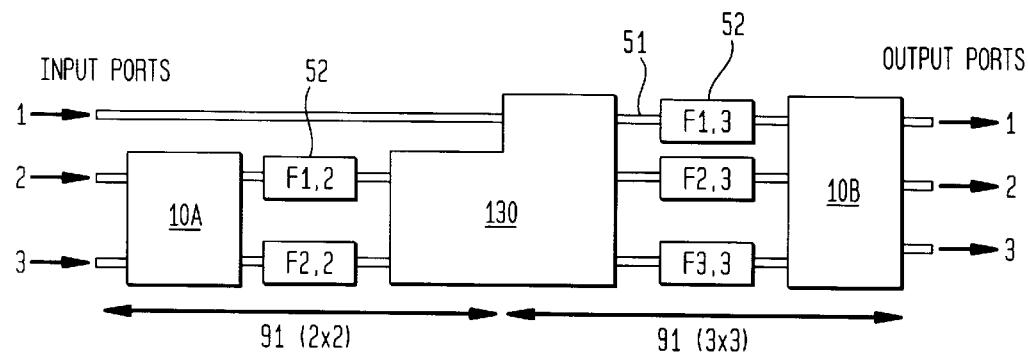
FIG. 13 illustrates a further embodiment of an optical switch wherein adjacent multimode interference regions are cojoined.

It is recognized that the multimode interference regions of adjacent switches may be cojoined without the intermediate use of a connecting optical waveguide path. This makes for a more compact device structure and may offer the advantage of reduced optical insertion loss. This arrangement, illustrated for a 3×3 switch, is shown in FIG. 13. The cojoined slab region 130 substitutes for the 10B coupler of the 2×2switch and the 10A coupler of the 3×3 switch.

Figure 14:
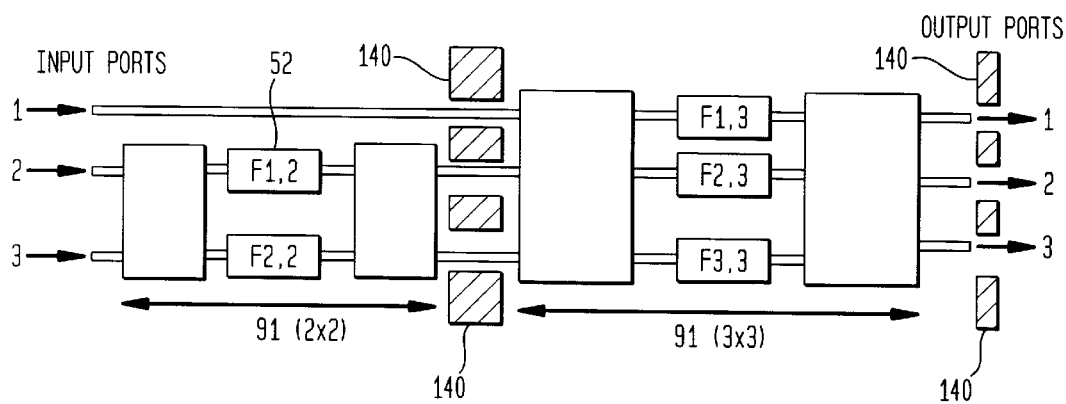
FIG. 14 illustrates an alternative embodiment of an optical switch including optical absorbing regions for capturing and absorbing stray light.

It is also recognized that in order to reduce cross talk it might be advantageous to introduce intentionally optically absorbing or dispersing structures between the sequential switching elements to capture and eliminate stray light scattered from previous optical switching units. Such absorber or dispersive structures may be provided by suitable deposited or grown materials or by the introduction of reflection facets formed by a suitable fabrication process such as etching. Such structures would be placed so as to be optically distant from the interconnecting optical pathways but disposed so as to substantially block entry of stray light into area of the subsequent multimode coupler regions. A possible arrangement is illustrated in FIG. 14, with the absorbing structures 140 advantageously disposed between successive cascaded switches 91.

Any convenient planar waveguide material system may be employed: Silica planar waveguides [Ref. 1], Ion-exchanged glass and dielectric waveguides [Ref. 2], or semiconductor-based waveguides [Ref. 3]

The means of providing the phase control on the elements connecting the multiport couplers may be various and will depend on the waveguide material system employed. In the case of semiconductor-based waveguides, optical phase control may be effected by means of a voltage-induced movement of the semiconductor band-edge or by carrier injection (or depletion) within a section of the connecting waveguide. In the case of a dielectric waveguides such as Lithium Niobate, an applied voltage may be used to induce a refractive index change in the waveguide phase-control section. For silica-based wavguides, thermo-optic heating may be employed, in which the waveguide phase control section is heated and an optical phase change results from the consequent change in the waveguide refractive index. It is understood that this invention is not restricted to any specific planar waveguide material system, nor to any particular means of providing the phase control in the waveguide sections connecting the multi-post couplers.

It is understood that the invention, although described with respect to its planar implementation, includes those realizations in three-dimensional systems such as may be provided by multi-layer planar waveguide devices or by fused fiber devices or bulk optical devices. It is understood that the invention includes all 'higher order'spatial switch architectures formed through the inter-connection, according to normal practice, of the basic switch elements described here.

In addition to the space switching function considered in detail above, by arranging the optical path lengths of inter-connections between linked MMI-couplers comprising a switch to differ by pre-determined multiples of the optical wavelength, the transmission function of the switch may be made wavelength sensitive. This provides a wavelength selective element and forms a wavelength division multiplexer, as have been reported [Refs. 18, 19, 20, 21]. By introducing the switching function, a composite wavelength- and space- switch is formed. A switching fabric incorporating such elements may be constructed to provide both wavelength-division and spacedivision switching functions.

The switch architectures described may form part of higher order spatial switches and switches that may include in their realization components that provide switching also in time domain and in the wavelength domain.

REFERENCES

1. "Silicon optical bench waveguide technology", Y. P. Li and C. H. Henry, chapter 8 of "Optical Fiber telecommunications IIIB", ed. I. P. Kaminov and T. L. Koch, Academic Press, 1997.

2. "Lithium Niobate integrated optics: selected contemporary devices and systems applications", F. Heismann, S. K. Korotky, and J. J. Veselka, chapter 9 of "Optical Fiber telecommunications IIIB", ed. I. P. Kaminov and T. L. Koch, Academic Press, 1997.

3. "Photonic Integrated Circuits", T. L. Koch and U. Koren, in "Integrated Optoelectronics, ed. M. Dagenais, R. F. Leheny and J. Crow, Academic press, 1995.

4. "Space-Division Switching", H. S. Hinton, J. R. Erickson, T. J. Cloonan, and G. W. Richards, chapter 3 of "Photonics in switching, Vol II: systems", ed J. E. Midwinter, Academic press, 1993.

5. "Switching", chapter 8, of "An engineering approach to computer networking", S. Keshav, Addison-Wesley, 1997.

6. "Optical Networking", R. Ramaswami and K. N. Sivarajan, Morgan Kaufmann, 1998.

7. "16×16 Structly nonblocking guided wave optical switching system", E. J. Murphy, T. 0. Murphy, A. F. Ambrose, R. W. Irvin, B. H. Lee, P. Peng, G. W. Richards, and A. Yorinks, *J. Lightwave Tech.*, 14, 352–358, 1996.

8. "Low-loss and high-extinction-ratio silica-based strictly nonblocking 16×16 thermooptic matrix switch", T. Goh, M. Yasu, K. Hattori, A. Himeno, M. Okuno and Y. Ohmori, *Photonics Technology Letters*, 10, 810–812, 1998.

9. R. Ulrich, "Image formation by phase coincidences in optical waveguides", *Optical Communications*, 13, p. 259–264,1975.

10. L. Soldano, F. B. Veerman, M. K. Smit, B. H. Verbeek, A. H. Dubost, and E. C. M. Pennings, "Planar monomode optical couplers based on multi-mode interference" *J. Lightwave Tech*, 10, p1843–50, 1992.

11. L. Soldano and E. Pennings, "Optical multi-mode interference devices based on self-imaging: principles and applications", *J. Lightwave Tech.*, 13, p615–627, 1995.

12. M. Bachmann, P. A. Besse, and H. Melchior, "General self-imaging properties in N×N multimode interference couplers including phase relations", *Applied Optics,*33, p3905–3911, 1994.

13. P. A. Besse, M. Bachmann, H. Melchior, L. B. Soldano, and M. K. Smit, "Optical Bandwidth and fabrication of multimode interference couplers", *J. Lightwave Tech.*, 12, p1004–9, 1994.

14. E. C. M. Pennings, R. J. Deri, A. Scherer, R. Bhat, T. R. Hayes, N. C. Andreadakis, M. K. Smit, L. B. Soldano, and R. J. Hawkins, "Ultracompact low loss directional couplers on InP based on self-imaging by multimode interference", *Applied Physics Letters*, 59, p1926–28, 1991.

15. R. M. Jenkins, J. M. Heaton, D. R. Wight, .J. T. Parker, J. C. H. Birbeck, and K. P. Hilton, "Novel 1-to-N way integrated optical beam splitters using symmetric mode mixing in GaAS/AlGaAs multimode waveguides", *Applied. Physics. Letters*, 61, p1754–56, 1992

16. R.M. Jenkins, J. M. Heaton, D. R. Wight, .J. T. Parker, J. C. H. Birbeck, G. W. Smith, and K. P. Hilton, "Novel 1×N and N×N integrated optical switches using self-imaging multimode GaAs/AlGaAs waveguides", *Appl. Phys. Lett.*, 64, p684–6, 1994.

17. M. Bachmann, Ch. Nadler, P. A. Besse, and H. Melchior, "Compact polarization multi-leg 1×4 Mach-Zehnder switch in InGaAsP/InP, *European Conf. on Optical Communications, ECOC* '94, conference proceedings, p519–522,1994.

18. C. van Dam, M. R. Amersfoort, G. M. ten Kate, F. P. G. M. van Ham, M. K. Smit, P. A. Besse, M. Bachmann, and H. Melchior, "Novel InP-based phased-array wavelength demultiplexer using generalized MMI-MZI configuration", *European Conference on Integrated optics, ECIO'94*, Genoa, Italy, conference proceedings, p275–8, 1994.

19. Liestuen and A. Sudbo, "8-channel wavelength division multiplexer based on multimode interference couplers", *Photonics Technology Letters*, 7, p1034–36,1995.

20. Bachmann, P. A. Besse, Ch. Nadler, and H. Melchior, "The integrated prism interpretation of multi-leg Mach-Zehnder interferometers based on multimode interference couplers", *Optical and Quantum Electronics*, 27, p909–920, 1995.

21. M. R. Paiam and R. I. MacDonald, "Design of phased-array wavelength division multiplexers using multimode interference couplers", *Applied Optics*, 36, p5097–5108, 1997.

What is claimed is:

1. An N×N non-blocking optical routing switch consisting essentially of a series of connected optical switches of unitary increasing switch dimension, wherein at least two of said connected optical switches each comprise:
   a pair of multiport self-imaging multimode interference couplers,
   a plurality of optical pathways connecting said couplers, and
   a plurality of phase controlling elements in respective ones of said interconnecting pathways.

2. The switch of claim 1 wherein said two connected optical switches comprise a 2×2 switch connected to a 3×3 switch.

3. The switch of claim 1 wherein each said connecting optical pathway includes a phase control element.

4. The switch of claim 3 wherein at least one said phase controlling element is thermally adjustable.

5. The switch of claim 3 wherein at least one said phase controlling element is electro-optically adjustable.

6. The switch of claim 3 wherein at least one said phase controlling element is adjustable through carrier injection.

7. The switch of claim 1 on all but one of said interconnecting pathways includes a phase control element.

8. The switch of claim 1 wherein the said connected optical switches and said connecting optical pathways are provided in a common waveguiding material system.

9. The switch of claim 8 wherein said common waveguiding material system is a silica planar lightwave system.

10. The switch of claim 8 wherein the said common waveguiding material system is a semiconductor material system.

11. The switch of claim 10 wherein the said semiconductor waveguide material system is the InP/InGaAsP material system.

12. The switch of claim 1 adapted to operate in the long wavelength optical transmission band of optical fibers.

13. The switch of claim 1 where $N \geq 4$.

14. The switch of claim 1 where $N \geq 8$.

15. An N×N non-blocking optical routing switch comprising a series of connected optical switches,
   said connected optical switches forming a sequential series of switches of unitary increasing switch dimension, and
   an optically absorbing or dispersing structure for absorbing or dispersing scattered radiation generated by the first optically connected switch.

* * * * *